United States Patent [19]

Huang

[11] Patent Number: 4,943,132
[45] Date of Patent: Jul. 24, 1990

[54] PASSIVE FIBER-OPTIC POLARIZATION CONTROL

[76] Inventor: Hung-chia Huang, Jiang Ning Road, 83 Lane, No. 4, Suite 404, Shanghai, China

[21] Appl. No.: 310,872

[22] Filed: Feb. 16, 1989

[30] Foreign Application Priority Data

Oct. 23, 1988 [CN] China .............................. 88107389.X

[51] Int. Cl.$^5$ .............................................. G02F 1/19
[52] U.S. Cl. ............................... 350/96.13; 350/96.15; 350/378; 350/400
[58] Field of Search .................. 350/96.13, 96.15, 378, 350/387, 400

[56] References Cited

U.S. PATENT DOCUMENTS

| 4,389,090 | 6/1983 | LeFevre | 350/96.29 |
| 4,729,622 | 3/1988 | Parlath | 350/96.15 |
| 4,793,678 | 12/1988 | Matsumoto et al. | 350/96.15 |
| 4,801,189 | 1/1989 | Shaw et al. | 350/96.15 |

OTHER PUBLICATIONS

"Weak Coupling Theory of Optical Fiber and Film Waveguides" by Huang Hung-Chia, Radio Science, vol. 16, No. 4, pp. 495-499 (1981).

"Coupled Modes and Nonideal Waveguides" by Huang Hung-Chia, Microwave Research Institute (MRI), Polytechnic Institute of New York, Nov. 1981.

Primary Examiner—Bruce Y. Arnold
Assistant Examiner—Vincent A. Frouhar

[57] ABSTRACT

A theoretical prediction controls, by a purely passive fiber-optic element, a seemingly uncontrollable linear polarization whose orientation is all but unpredictable. A transformation of an unpredictable polarization orientation into a definite pre-assigned polarization orientation is useful in coherent optical communication and other fiber-optic polarization-dependent systems. A method of making the device utilizes, in a nonconventional way, the presently available fiber-fabrication techniques. A preform of an on-drawing optical fiber of appropriate birefringence is twisted with a monotonously slow-decaying rotational speed. The device is attractive to all obvious advantages inherent to the all-passive nature of the fiber structure.

7 Claims, 4 Drawing Sheets

PASSIVE FIBER-OPTIC POLARIZATION CONTROL

FIELD OF THE INVENTION

This invention relates to polarization optics in single-mode optical fiber, and in particular, polarization control in a coherent fiber-optic communication system.

BACKGROUND OF THE INVENTION

Among the technological problems to be solved before realization of the attractive new generation of optical fiber communication called "coherent optical communication", the use of the nominal single-mode optical fiber as the transmission medium presents a major difficulty. This is because, in a conventional optical fiber with circular core and claddings, there exist two nearly degenerate orthogonally polarized modes, so that an incident linearly polarized mode will assume an unpredictable polarization after trasversing a distance along a practical optical fiber transmission line whose property is always variably perturbed. This unpredictability of the polarization orientation is most annoying in a coherent communication system which requires polarization matching of the signal with the local oscillator of the receiver.

To overcome the difficulty, great efforts have been made during recent years along two different lines of thought and technological approaches.

The first approach is a continual attempt aimed at using high-birefringent fiber, instead of conventional fiber, for the entire transmission line of a coherent optical communication system. Remarkable progress, notably in the making of relatively long Panda fiber, has been achieved in this direction. Y. Sasaki et al, 26 km-long polarization-maintaining fibre, Electron. Lett., vol. 23, No. 3, pp. 127-128 (1987). T. Kimura, Coherent optical fiber transmission, J. Lightwave Tech. vol. LT-5, No. 4, pp. 414-428 (1987). For practical utilization of high-birefringent fiber of one or the other version in a long-haul coherent optical fiber transmission line, the high-birefringent fiber is required to have overall transmission characteristics as good as the well-developed conventional optical fibers. In particular, low-loss for the propagating mode of the desired polarization and small coupling between this mode and the mode of the undesired polarization is required. Additionally and sometimes more importantly, the problem of cost is a deterministic factor to judge whether or not it is favorable to use high-birefringent fiber for the entire long-haul line.

The second approach takes advantage of using the well-developed conventional low-loss single mode optical fibers as the transmission medium without any structural modifications, while incorporating at the far end of the long line a polarization-control device to control the unpredictable polarization. The polarization-control device can be used not only in future coherent optical communication lines, but also at terminals of existing optical fiber transmission lines for upgrading the communication characteristics. This second technological approach was probably induced, or encouraged, by the well-known BTRL's experiments, which indicated that the output polarization from a conventional long fiber, though unpredictable, is relatively stable, with a time constant in the order of hours, so that the changing polarization can be controlled by the currently available electronics-optics techniques. D. W. Smith et al, Polarization stability requirements for coherent optical fiber transmission systems, OPTICAL WAVEGUIDE SCIENCES, Proceedings of International Symposium, Martinus Nijhoff Publishers, the Hague/Boston/Lancaster, Jun. 1983, pp. 133-156. Such polarization-control devices fall into the category of active scheme because all of them require some form of active optoelectronic circuitry. Also the higher the required control performance, the more complicated and sophisticated the over-all electronics/optics generally will be. R. Ulrich, Polarization stabilization on single-mode fiber, Appl. Phys. Lett., vol 35, No. 11, pp. 840-842 (1979). T. Okoshi, Polarization control schemes for heterodyne-homodyne optical fiber communications, J. Lightwave Tech., vol. Lt-3, No. 6, pp. 1232-1237 (1985). While trial systems following this active approach have been used and advanced during recent years, it doesn't seem likely to see in the near future the realization of an absolutely manual-free polarization control device for coherent communication use.

The present invention, which is based on an analytic prediction of the super-mode theory, represents a new approach to solving the polarization-control Huang Hung-chia, Weak coupling theory of optical fiber and film waveguides, Radio Science, vol. 16, No. 4, pp. 495-499 (1981). Huang Hung-chia, COUPLED MODES AND NONIDEAL WAVEGUIDES, Microwave Research Institute (MRI), Polytechnic Institute of New York, Nov. 1981. Instead of an active circuitry, a purely passive fiber-optic device is used at the far end of a conventional optical transmission line to automatically change an unpredictable polarization orientation to a specified orientation. The price paid for such an all-passive fiber-optic device is a power penalty of 3 dB. From the power-budget point of view, this generally will not pose a problem, as coherent optical communication systems are capable of improving the sensitivity of the present-day direct-detection receiver by 15-20 dB. In view of the current line of thought that coherent optical systems may prove useful also in local networks, where the primary interest is in the multiplexing possibility, while providing a useful increase in power budget, the present invention adopting the passive-device approach is apparently superior for its low cost and engineering simplicity. The passive polarization-control device also possesses the advantage of possible afterwards upgrading of the terminal devices. Such a feature is preferred more than the all high-birefringent fiber approach.

Advantages of the present invention, most of which are due to the passive nature of the device, are summarized below:

(1) small size and light weight;
(2) structural simplicity;
(3) operational dependability;
(4) low cost;
(5) no limitation on finite controllable-range of the polarization;
(6) no limitation on the time rate of the randomly-varying input polarization; and
(7) long life-time.

SUMMARY OF THE INVENTION

The present invention is based on the discovery of a slow-decaying coupling mechanism in a specially designed fiber-optic structure, which is capable of gradually transforming an unpredictable polarization orientation to the desired orientation. A strong initial coupling is imparted to the two components, or two modes in the x and y directions, of an arbitrarily oriented linear polarization, such that the initial powers carried by the two modes are redistributed in a fast process of conversions and reconversions, resulting in almost equal rises and falls, or up's and down's, of the mode powers from an average value. The slow-decaying coupling mechanism makes the power up's and down's to subside gradually in the transmission direction and eventually a state of almost equal division of power is reached between the two modes. It is thus possible to secure a desired well-oriented polarized mode, say $A_x$, to match with the polarization-sensitive receiver, by removing $A_y$ with the aid of an appropriate polarizer. An all-passive fiber-optic polarization control is thus achievable at a price of 3 dB power penalty.

Central to the making of the invented device is to varyingly twist by spinning the preform being drawn of an optical fiber of appropriate birefringence with a rotational speed whose initial value is sufficiently high and whose decaying rate is sufficiently low. The corresponding initial spin pitch $l_s$ should be much smaller than the beat length $l_b$ of the two orthogonal modes; specifically, $l_s/l_b=0.1$ or smaller. This specification is not so severe as it would appear, because the required duration of the high initial spinning speed is momentarily short. The way that the spinning speed decays to zero is not important, so long as it is monotonously and slowly decaying. The total length L of the resulting special fiber section having a variable spin-pitch should be much larger than the beat length $l_b$ and at optical wavelength, it is convenient to take $L/l_b$ to be about $10^2$.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
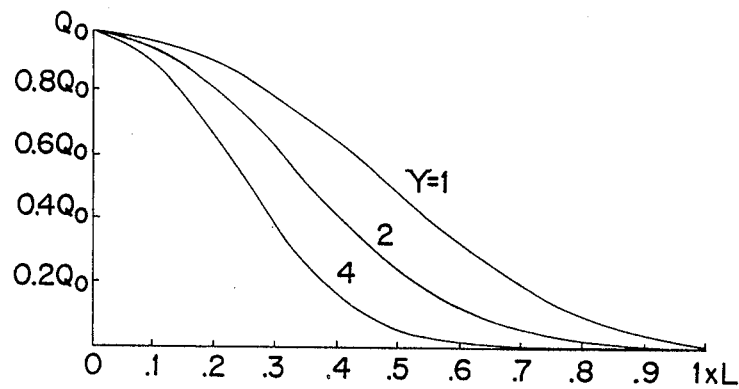
FIG. 1 shows a set of curves which simulates the monotonously decaying function for the coupling parameter Q, or for the varying rotational speed of the spinner.

In a fiber-optic element whose local structure varies in the transmission direction z, the local modes $A_x$ and $A_y$ and the super modes $W_x$ and $W_y$ are related, according to the afore-quoted articles by Huang Hung-Chia by the following transformation:

$$A_x = \cos\psi W_x + \sin\psi W_y \tag{1a}$$

$$A_y = j\sin\psi W_x + \cos\psi W_y \tag{1b}$$

where $$\psi = 0.5 \mathrm{arctg}(2Q) \tag{2}$$

in which $Q=c/\Delta\beta$ is a coupling parameter, called coupling capacity, with c denoting the coupling coefficient and $\Delta\beta$, the phase difference of $A_x$ and $A_y$. The wave factor $\exp\{j(\omega t - \beta z)\}$ for all A's and W's is not explicitely written.

The super modes satisfy the following equations:

$$W_x' = jqW_x - j\phi' W_y \tag{3a}$$

$$W_y' = -j\phi' W_x - jqW_y \tag{3b}$$

where the superscript prime (') denotes differentiation with respect to z, and $$q = \pi(1+4Q^2)^{\frac{1}{2}} \tag{4}$$

$$\phi' = (1+4Q^2)^{-1} Q' \tag{5}$$

The zero-th order approximate solution of Eqs.(3a,b) for small ($\phi'/2q$) is $$W_x \simeq W_x(o) \exp\left(j \int_0^z q\,dz\right) \tag{6a}$$

$$W_y \simeq W_y(o) \exp\left(-j \int_0^z q\,dz\right) \tag{6b}$$

The first order approximation is derived by the iterative method:

$$W_x \simeq \xi \left\{ W_x(o)\left[1 - \int_0^z \phi'\xi^{-2}\left(\int_0^z \phi'\xi^2 dz\right)dz\right] -jW_y(o)\int_0^z \phi'\xi^{-2}dz \right\} \tag{7a}$$

$$W_y \simeq \xi^{-1}\left\{jW_x(o)\int_0^z \phi'\xi^2 dz + W_y(o)\left[1 - \int_0^z \phi'\xi^2\left(\int_0^z \phi'\xi^{-2}dz\right)dz\right]\right\} \quad (7b)$$

where $$\xi \simeq \exp\left[\int_0^z \pi(1+4Q^2)^{\frac{1}{2}}dz\right] \quad (8)$$

and $W_x(o)$, $W_y(o)$ can be derived as an inverse transformation from Eqs.(1a,b) for given $A_x(o)$, $A_y(o)$. In all the equations, z is normalized with respect to the beat length $l_b = 2\pi/\Delta\beta$ of the two local modes. A normalized input light of unit amplitude is assumed such that $|A(o)|=1$, $A_x(o)=\cos\theta$, $A_y(o)=\sin\theta$, where $\theta$ is the initial polarization orientation angle.

In an idealized theoretical model, if the derivative or rate of change of Q is infinitesimally small over the interval concerned, the super modes are almost the eigenmodes of the fiber structure. Under this condition, the output modes approach asymptotically to the following expressions as the initial value $Q_o$ becomes indefinitely large:

$$A_x(L) \simeq \sqrt{2}(\cos\theta - j\sin\theta)\exp\left(\int_0^L qdz\right) \quad (9a)$$

$$A_y(L) \simeq \sqrt{2}(-j\cos\theta - \sin\theta)\exp\left(-\int_0^L qdz\right) \quad (9b)$$

This leads to the idealized state of equal power division:

$$|A_x(L)|^2 = |A_y(L)|^2 = 0.5 \quad (10)$$

Of particular importance is the absence of $\theta$ in this end result, showing that the state of equal power division is achieved irrespective of the input polarization orientation angle, which is actually unpredictable.

The phase difference between the output x and y polarized modes is derived from Eqs.(9a,b):

$$\Omega \simeq 2\theta + \pi/2 + \int_0^L qdz \quad (11)$$

The re-appearance of the orientation angle $\theta$ in this phase relation reveals that the phase of the output polarized light becomes unpredictable, if the input polarization orientation is unpredictable. Thus, an all-passive fiber structure of an everything-predictable nature possesses the capacity of transforming one form of unpredictability into another form of unpredictability, but not the capacity of throwing off the already existing unpredictability entirely. Here, the phase unpredictability will not pose a problem in many areas of application; for example, in a digital FSK coherent communication channel, the carrier phase information does not need to be preserved, but the frequency of a stable amplitude is required for freedom of information penalty.

The above outline of mathematical formulation provides an analytic basis for the design frame-work of the present invention. The design starts with a specification of the coupling capacity Q, whose initial value $Q_o$ is sufficiently large and whose decaying rate is sufficiently slow. FIG. 1 shows a set of functions which simulates variation of the coupling capacity Q, or correspondingly, the spinning speed $\tau = 2\pi Q/l_b$:

$$Q = Q_o[0.5 + 0.5\cos(\pi z/L)]^\gamma \quad (12)$$

where $Q_o$ is taken to be equal to or larger than 10, and L, the total length of the fiber structure normalized with respect to $l_b$, is taken to be about $10^2$. The parameter $\gamma$ governs the pattern in which the Q-function slopes down from a maximum value to zero.

Figure 2:
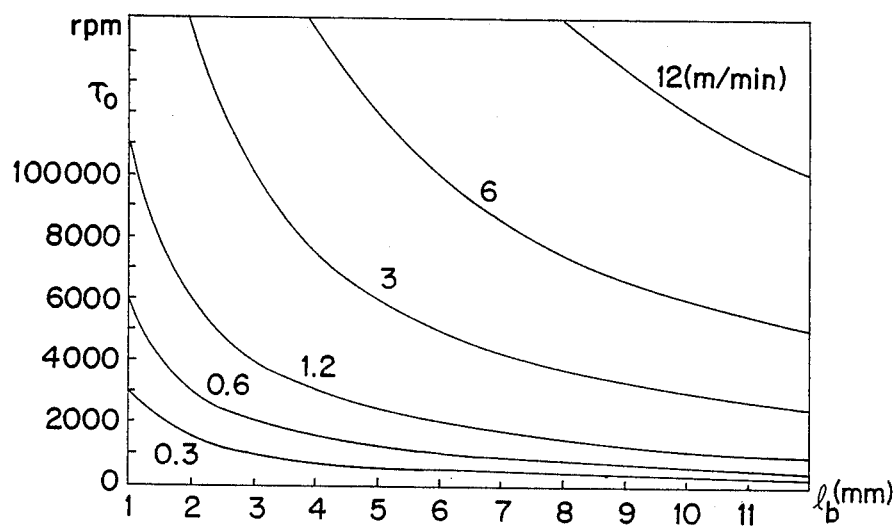
FIG. 2 is a diagram showing appropriate combinations of the required values of the pertinent parameters for making the device.

Appropriate combinations of the values of the pertinent parameters for practical device-making are shown in FIG. 2. The required initial spinning speeds as marked on the ordinate of the diagram are for $Q_o = 10$. For larger $Q_o$, the value of the initial spinning speed is scaled up proportionally. This represents a stringent technological specification peculiar to the present invention, which requires a nonconventionally fast initial spinning speed associated with a nonconventionally slow linear drawing speed. However, the high spinning or rotational speed is not required to continue constantly over the entire course of fiber-drawing, but to run only momentarily through a short initial duration. FIG. 2 shows that, from the viewpoint of relaxing the stringent speed requirement, it is feasible to choose the beat length not too short, but only short enough to be capable of holding the desired polarized light at the output.

Figure 3:
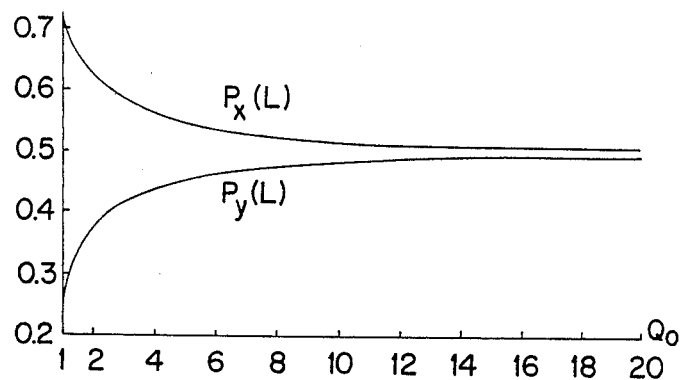
FIG. 3 shows the effect of the initial coupling capacity $Q_o$ in achieving the required eventual state of equal power division between the two orthogonally polarized modes.
Figure 4:
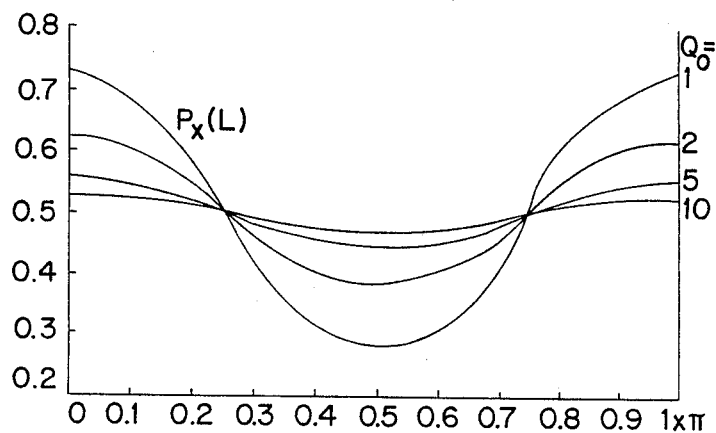
FIG. 4 shows the power output $P_x$ or $P_y$ versus the input polarization orientation angle $\theta$, for different $Q_o$.

The initial value of the coupling capacity $Q_o$ plays a deterministic role in achieving the desired polarization-control behavior. FIG. 3 shows that the two output orthogonal modes tend to a more and more stable state of equal power division as the value of $Q_o$ increases above 10. FIG. 4 shows the effect of increasing the value of $Q_o$ in diminishing the pulsations of any of the two output powers due to variations of the input polarization orientation. When $Q_o$ is equal to or larger than 10, the output power pulsations become small, and the almost equal power division state at the output holds irrespective of the input polarization orientation. Thus, with one mode, say the horizontally polarized mode $A_x$, taken as the desired mode, while $A_y$ as the undesired mode to be removed by a subsequent polarizing process, even a pure vertically polarized input light will become horizontally polarized at the output at a price of 3 dB power penalty. Alternatively, with $A_x$ removed by a polarizer, a horizontally polarized light can be made to become vertically polarized, if so desired.

Figure 5C:
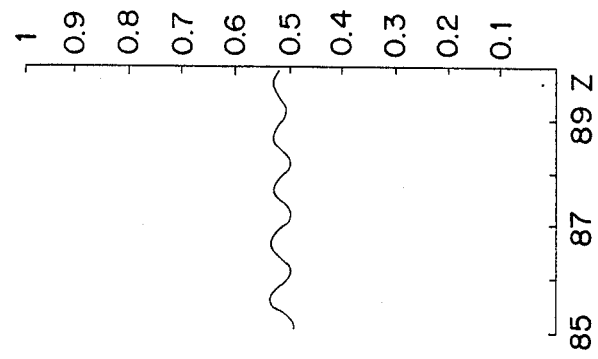
FIG. 5a, b, c show the evolution of $P_x$ or $P_y$ in the initial, intermediate and final portions of the fiber-optic structure.
Figure 5B:
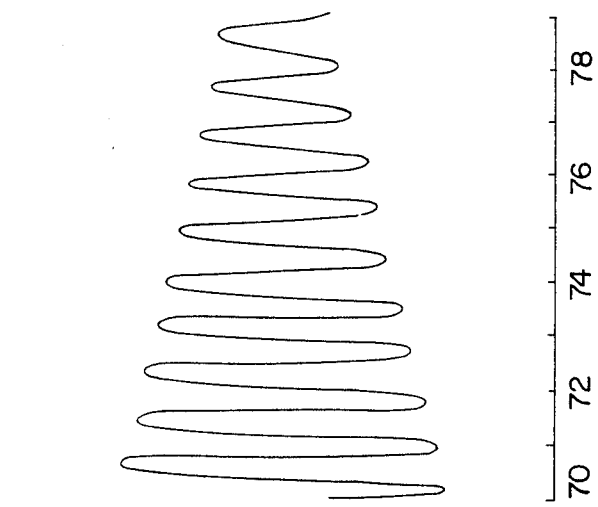
Figure 5A:
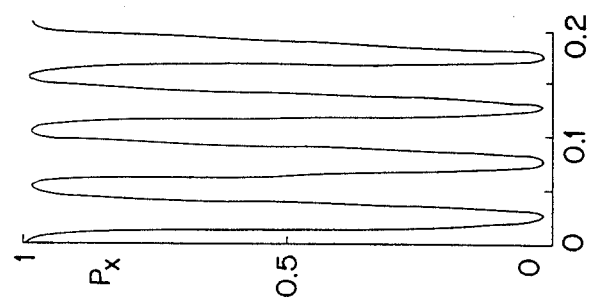

FIG. 5 shows the evolution of the mode power $P_x$ along the fiber structure. The mode power $P_y$ can be obtained from $P_x$ by the simple relation $P_x + P_y = 1$. In FIG. 5, the initial section (a) of the structure is featured by a strong coupling between the two components, or two orthogonal modes in the x and y directions, of the input polarized light. An almost complete power transfer takes place swiftly back and forth from one mode to the other. This almost complete power conversions-reconversions decay gradually through the intermediate section (b) of the structure, which is featured by a transition from strong coupling to weak coupling of the modes. The end section (c) is featured by a weak coupling between the modes carrying almost equal powers, with rise and fall vanishing gradually towards the output end. The higher the value of the initial coupling capacity $Q_o$, the less the eventual deviations of the two mode powers from 0.5 will be.

The form of the coupling capacity Q as a function of z is relatively less important. A different choice of the functional form of Q will change the transmission picture from strong coupling to weak coupling of modes, but will not affect the end results for the mode powers. A larger value of the parameter $\gamma$ of the Q-function will produce an earlier decaying of the swift almost complete power conversions-reconversions. The loose requirement in specifying the Q-function is an advantageous feature from the viewpoint of practical device-making because it greatly relaxes the relevant fabrication tolerances. The parameters used in FIG. 5 are $\gamma=2$, $Q_o=10$, $L=100$.

Figure 6:
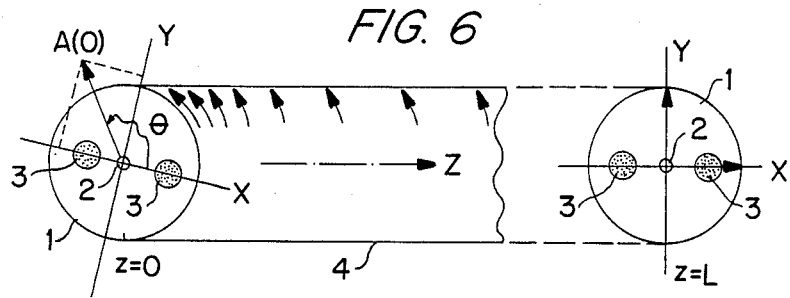
FIG. 6 is a schematic drawing of the fiber-optic structure which performs the equal power division function.

FIG. 6 is a schematic drawing of the fiber structure which performs the equal power division function. In the figure, numeral 4 is a birefringent optical fiber whose unspun-state beat length is appropriately chosen according to the specifications indicated in FIG. 2. The marks 2 and 3 denote the fiber core and the stress-applying regions, respectively. Isolated stress-applying regions are shown in FIG. 6, but fibers of other versions will make no difference. FIG. 6 shows that the fiber is made with a fast initial spinning, which gradually slows down along the fiber length. FIG. 6 also includes an input linear polarized light A(o) at z=o, which is arbitrarily oriented, achieving a state of almost equal power division at the output end z=L.

Figure 7:
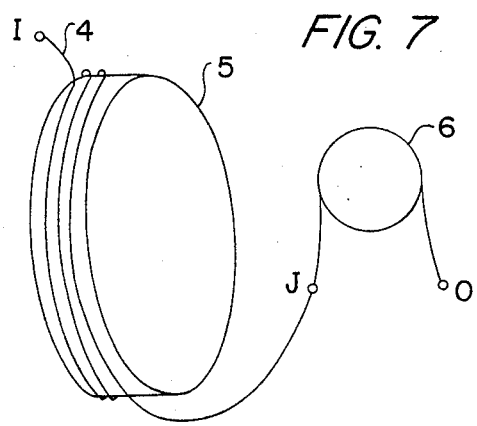
FIG. 7 diagramatically shows a complete polarization-control device comprising two parts, i.e., a equal power division component and a polarizer, jointed together.

For device-making purpose, it is convenient to wind the above power-equalization fiber component 4 around a reel 5 as shown in FIG. 7, with a sufficiently large radius to avoid macrobending losses. The end of this fiber component 5 is jointed at J, as shown in FIG. 7, with a polarizer 6 to form a complete polarization-control device. An arbitrarily oriented polarized light at the input end I will turn out to be the desired polarized light at the output end O.

Figure 8:
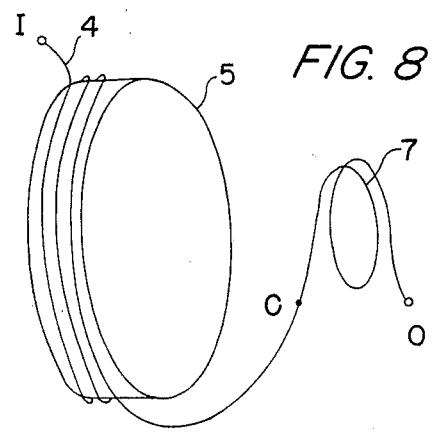
FIG. 8 shows a jointless two-section polarization-control device.

An alternative fabrication scheme is to make use of the well-established bending technique to perform the polarizing function. The entire polarization-control device can be thus made in a single-step fabrication process. The first fiber section is drawn with a varyingly spinning speed afore-described. After completion of this section, the spinner or motor remains at rest, while the linear drawing of the fiber continues to produce an additional length of fiber suitable for the required polarizing function. The complete device is thus made in the form of a two-section junctionless piece of fiber, with the second fiber section 7 wound afterwards around a reel of small radius. The advantage of this scheme is to eliminate one joint, i.e., J in FIG. 7, between the power-equalization component 5 and the polarizing element 6. In FIG. 8, C indicates a jointless connection of the fiber sections 5 and 7. The disadvantage of this scheme is its less freedom in the choice of the value of the beat length which is now required not only to suit the initial conditions specified in FIG. 2, but also the special conditions necessary for the making of the desired bending-produced polarizer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling, in a purely passive way, an unpredictable orientation of a linearly polarized light in a single mode optical fiber, comprising:
   providing a media having two orthogonal preferred modes of polarization,
   providing a coupling, between said modes of polarization, with variable strength along the transit path of light,
   said coupling having a strong initial strength and gradually decreasing to zero along the transit path of light, so that initially the powers of the two modes undergo a fast oscillating process of conversions and reconversions, along the transit path of light, with almost equal amplitudes of the rises and falls of the mode powers from an average value, until gradually, because of decrease in coupling strength, these rises and falls subside to reach an eventual state of almost equal division of power between the polarization modes.

2. A polarization mode power-equalization fiber which is fabricated by spinning the preform of a birefringent fiber, as it is being drawn, with a variable rotational speed dropping from a high initial value gradually to zero.

3. An all-passive fiber optic polarization control device comprising:
   two fiber-optic components in series, the first component being a specialized fiber of variable spin-pitch having two preferred orthogonal polarization modes and converting a linearly polarized light of an arbitrary orientation to an output light with equal power between its two orthogonal polarization components and the second component being a polarizing element to remove an undesired component of said output light.

4. The polarization control device according to claim 10, wherein the polarizing element, used to remove the 3, wherein the polarizing element, used to remove the polarizer whose input terminal is connected to the output terminal of said fiber of variable spin-pitch component.

5. A process of making an all-passive fiber-optic polarization control device comprising:
   fabrication of a specialized fiber of variable spin-pitch by spinning the preform of a birefringent fiber, as it is being drawn, with a high initial rotational speed which drops to zero gradually,
   fabrication of a fiber-optic polarizer section by linear drawing of the fiber preform and winding afterwards so that said fiber-optic polarizer section performs as a polarizer through a bending-induced polarizing property.

6. The process of making an all-passive fiber-optic polarization control device according to claim 5, wherein the initial spinning speed and the linear drawing speed of the preform in fabricating the specialized fiber of variable spin-pitch device are such that the ratio of initial spinning pitch to beat length of the local polarization modes of the birefringent fiber, at its unspun state, is equal to or less than 0.1, and the variation of the spinning speed follows a slowly and monotonously decaying, but otherwise arbitrary, function over the entire length of said fiber of variable spin-pitch component, and wherein said entire length may be chosen to be about $10^2$ times said beat length.

7. The process of making an all-passive fiber-optic polarization control device according to claim 5, wherein a single step fabrication process is devised in such a way that, after completion of the making of said fiber of variable spin-pitch component, the linear drawing of the fiber preform continues for an additional length to be wound afterwards as the second fiber section performs as a polarizer through a bending-induced polarizing property.

* * * * *